Figures 1, 2:
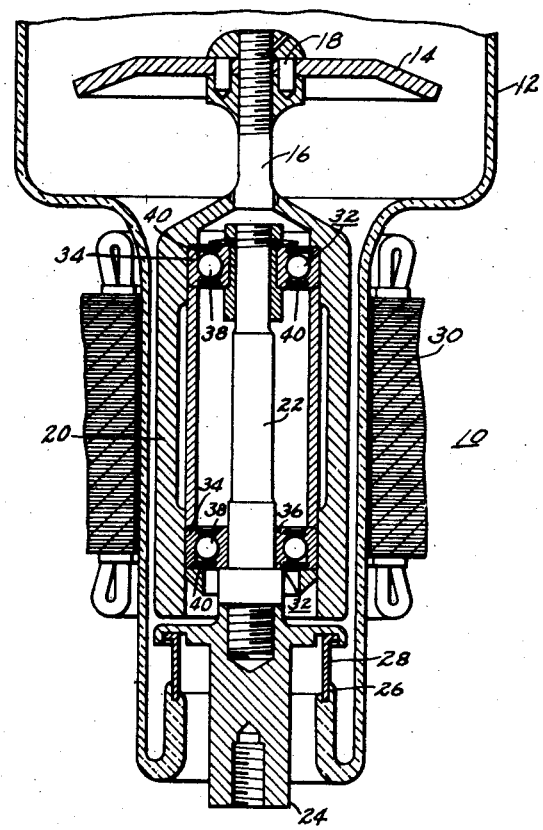

April 28, 1942.　　　　P. H. BRACE　　　　2,280,886

BEARING LUBRICANT FOR VACUUM SERVICE

Filed March 4, 1941

WITNESSES:
Leon M. Garman
J. Shapot

INVENTOR
Porter H. Brace.
BY
Ezra W. Savage
ATTORNEY

Patented Apr. 28, 1942

2,280,886

UNITED STATES PATENT OFFICE 2,280,886

BEARING LUBRICANT FOR VACUUM SERVICE

Porter H. Brace, Forest Hills, Pa., assignor to Westinghouse Electric & Manufacturing Company, East Pittsburgh, Pa., a corporation of Pennsylvania Application March 4, 1941, Serial No. 381,673

9 Claims. (Cl. 250—148)

This invention relates to the lubrication of bearings, particularly for use in high vacua. In a specific application of this invention, the satisfactory lubrication of rotating anode X-ray tubes is a feature.

Bearing structures for use in high vacuum service are extremely difficult to lubricate by customary methods. The usual oils and grease are unsatisfactory in many cases due to the high vapor pressure of the high lubricant whereby the vacuum is spoiled. In the case of X-ray tubes, the liquid lubricant will migrate to the anode target face and may cause the device to fail to operate. Even lubricants of the type which have extremely low vapor pressure, such as are used, for example, in diffusion pumps, have been found to be unsatisfactory for the purpose.

It has been found that flake graphite, which is ordinarily considered to be a good friction reducing medium for bearings, loses its desirable friction reducing properties in a vacuum. In the absence of air or gas graphite becomes abrasive in effect. When graphite is added to ball bearings in a vacuum, the balls and races are abraded and the surfaces are roughened within a short time. Accordingly, the customary lubricating materials known to the prior art are not satisfactory for use in high vacua.

The object of this invention is to provide for lubricating bearings which operate in a vacuum.

A further object of this invention is to provide for a lubricant having negligible vapor pressure at high temperatures while maintaining good friction reducing properties.

Other objects of the invention will, in part, be obvious, and will, in part, appear in the appended specification and claims.

For a fuller understanding of the nature and objects of the invention, reference should be had to the following detailed description taken in connection with the accompanying drawing in which:

Figure 1 is a cross-section of a portion of an X-ray tube having a rotating anode, and Fig. 2 is a cross-section through a fragmentary portion of a ball-bearing cage.

In order to be satisfactory for use as a lubricant in a high vacuum, a material should have low vapor pressure or a vapor pressure as low as the highest permissible pressure in the evacuated apparatus for the range of temperatures to which the material is to be subjected. In many cases, the vapor pressure must be practically unmeasurable. A high vapor pressure would not only cause the vacuum to deteriorate and thus interfere with the proper functioning of the apparatus, but in some cases the material might deposit upon other portions of the apparatus and either coat or film the members in such a manner as to prevent their proper operation.

It has been discovered that the molybdenum sulfide has a physical structure and chemical properties which render it highly suitable for use as a lubricant for bearings in a vacuum. It has been found that the crystals of molybdenum sulfide exhibit a plate structure in which in successive plates the molybdenum atoms are arranged in substantially the same plane with two layers of sulphur atoms between each layer of molybdenum atoms. The atoms in each layer lie in a plane hexagonal array. Furthermore, a large crystal of molybdenum sulfide is built up of layers of molybdenum attached by strong ionic linkages to adjacent layers of sulphur while the adjacent sulphur layers are held together only by weak homopolar linkage bonds. Thus the crystal consists of laminae having a central molybdenum atom array strongly bound to sulfur atoms on each side. These laminae of molybdenum sulfide therefore may be easily separated by mechanical forces into flat plates that have a flaky appearance and have a greasy feel.

While the sulphur layers have only a weak attraction for each other in forming a complete crystal of molybdenum sulphide, the same sulphur atoms have a much greater affinity for metals. Therefore, the molybdenum sulfide plates will attach themselves under certain condition quite firmly to metals. The sulphur atoms, having weak affinity for each other, will not be held by as great forces as those holding the sulphur to the metal, or even the metal to metal adhesive forces.

A ball or roller bearing formed of metal and run in a vacuum behaves differently than the same bearing operated in air. It has been found that the absence of an air film on the surfaces of the bearing member causes cohesion of metal between the several parts of the bearing while operating in the vacuum. The metal on the ball or roller will adhere or cohere to the metal on the races, and vice versa, as cohesive contact is made and broken as the balls roll during operation. The transfer of metal particles occurs rapidly and visible pitting will be evident in a short time. Both the balls and the races become rough, the bearings become increasingly noisy and the power required to operate them goes up considerably. In air, this cohesion which effects the roughening of a bearing in a vacuum does not take place probably due to the separative effect of a gas film on the surfaces of the metal.

By introducing molybdenum sulfide into a ball or roller bearing, the sulphur atoms adhere to the metal surfaces to provide a protective film which prevents metallic cohesion in a vacuum. Thus in addition to preventing cohesion between the film free surfaces of the bearing, the molybdenum sulfide exerts lubricating properties whereby the bearing characteristics are greatly improved. Even under high unit pressures, molybdenum sulfide will prevent metal to metal contact. In addition molybdenum sulfide has high temperature resisting characteristics so that it may be employed as a lubricant at temperatures which may run up to 700° C.

While the foregoing discussion has been specific to molybdenum sulfide, a group of four other metallic compounds has been discovered to have similar properties and therefore may be used for lubricating bearings in vacuum service. These metallic compounds are molybdenum selenide, molybdenum telluride, tungsten sulfide and tungsten telluride. Each of these metallic compounds is suitable for lubrication of bearings in high vacua and at high temperatures.

In applying molybdenum sulfide and the other metallic compounds listed herein to bearings for vacuum service, reference should be made to Fig. 1 of the drawing showing a specific form of the application. Fig. 1 is a cross-sectional view of a fragmentary portion 10 of a high output rotating anode type X-ray tube. The X-ray tube comprises a glass envelope 12 which is evacuated to the high degree that is required for this service, namely, less than one micron. The rotating anode 14 consists of a target of a metal such as tungsten which will function at the high temperatures produced by the impact of the electron beam.

In the prior art X-ray tubes are provided with a stationary anode. Due to the high heating effects of the electron beam the output of the stationary anode tube was restricted. It has been found that by rotating an anode, such as 14, at a high velocity the beam does not impact any one area of the tube for a length of time which would cause a deterioration on the tungsten surface. In effect the electron beam is distributed over a large peripheral area. Thus, a much higher output can be obtained by exposing successive portions of the anode surfaces to the electron beam. Outputs many times higher than that secured in the prior art with equivalent anode life may be produced by a tube of a given size.

The anode disk 14 is mounted upon a rotatable shaft 16 and secured thereto by nut and pin means 18. The shaft 16 is rigidly attached to the rotor 20 which imparts the necessary high velocity to the anode 14. The rotor 20 is supported upon the stationary shaft 22 for rotation thereupon. The shaft 22 is attached to the metallic tube support 24 which also acts as a ground. The metallic tube support 24 is sealed to the glass 12 and constitutes a part of the envelope system. A strip of metal 28, such as Kovar or the like, is welded to the support 24 and fused into the glass envelope 12 at the joint 26.

In order to provide for rotation of the rotor 24, a stator 30 is placed about the exterior of the glass envelope 12 in proximity to the rotor 20 so that rotation will be secured inductively by a rotating magnetic field produced by the stator.

The critical factor that makes the rotating anode a successful expedient is the bearing mounting for the rotor. Upon the shaft 22 are two ball bearings 32 for rotatably supporting the rotor 20. These bearings consist of the outer race 34, the inner race 36 and balls 38. In one embodiment of the invention the ball bearing carries a retaining seal 40 in order to keep a supply of molybdenum sulfide lubricant within the bearing.

One method of applying the molybdenum sulfide metallic compound to the bearing surfaces is to place the bearing balls 38 in a receptacle with a small quantity of flake molybdenum sulfide. The receptacle is shaken or rotated so that the balls thoroughly contact with the flake molybdenum sulfide. A thin adhering coating of the molybdenum sulfide will be present on the surfaces of the balls after a brief tumble. The quantity of molybdenum sulfide on the surface of the balls is sufficient for the usual life of the X-ray tube. The balls may be put into the races and the X-ray tube assembled and put into use without further addition of molybdenum sulfide.

In some cases, as a precautionary measure, additional flake molybdenum sulfide may be included in each sealed bearing. In this case the bearings are assembled with the coated balls and with a small supply of loose molybdenum sulfide, followed by the retaining seals 40.

When the ball bearings have been put into the glass envelope 12 and the assembled unit is sealed vacuum tight, it is the customary procedure to heat the entire structure to a temperature of about 700° C. to degas the metal while evacuating. This heat treatment fails to impair the lubricating properties of the molybdenum sulfide also. The severity of this phase of the tube manufacture will be appreciated when it is realized that the bearings are at a red heat.

Actual tests have shown that high quality ball bearings will coast from five to ten seconds in an evacuated tube without any lubricant. With a coating of molybdenum sulfide the same bearings will coast from five to twenty-five minutes. In addition, the noise level is decreased to a considerable extent and the rotating anode operation is much quieter. All experimental life tests to date on rotating anodes have not resulted in the failure of bearings containing molybdenum sulfide. For example, one anode has been started and stopped for 27,000 times without failure. Many more exposures or starts and stops could have been made on the same X-ray unit at the end of this test. In actual practice if desired, the anode coasting may be limited to five seconds by an electromagnetic brake after the electrical load on the tube has been removed.

A further feature of the molybdenum sulfide which lends itself to use as a lubricant in the rotating type of X-ray tube is the fact that molybdenum sulfide is a conductor. Thus no special connections are required to ground the anode structure. Thus stray currents which would cause trouble by arcing or spark breakdown are not encountered as would be the case with conventional non-conductive lubricants without bypass construction for grounding.

The degassing temperature to which the tube is exposed imposes a severe requirement which is satisfactorily met by the molybdenum sulfide. In continuous operation for many hours while producing X-rays, the temperature of the anode bearing will rise, but probably does not reach this degassing temperature. Normal bearing operating temperatures may reach several hundred degrees centigrade during long continued operation. Therefore the temperature characteristics of the molybdenum sulfide are an exceedingly important part of the invention. It has been successful in meeting all the requirements of this critical use.

While the balls may be initially coated with the lubricant by tumbling in a receptacle while in contact with molybdenum sulfide flakes, other methods of introducing the lubricant thereto may be employed. In some cases it may be entirely satisfactory to simply remove one of the sealing retainers 40 and add a predetermined amount of flake molybdenum sulfide into the bearing and replace the retainer and depend upon the normal operation of the bearing to distribute the flakes to all the contact metal surfaces.

Referring to Fig. 2 of the drawing, an alternative method of supplying molybdenum sulfide to the rolling elements of the bearing is shown. The balls 38 are surrounded by a cage similar to the conventional type of cages which serve to keep the balls spaced apart. The cage consists of two symmetrical members 50 designed to hold the balls 38 within the spherical recess 51. Rivets or other fastening means 52 secure the symmetrical halves 50 as a unit. Within each of the cage halves 50 is located a cavity 54 at a place where the balls 38 will contact frequently with the cage in normal operation. Within these cavities 54 is placed a quantity of molybdenum sulfide lubricant in a compacted state as produced by compression or an adhesive. As the bearing operates the balls 38 will rub against the material 56 and small quantities thereof will be deposited upon the surface of the balls and distributed throughout the bearing. This will insure an adequate supply of lubricant for the life of the bearing. The cage 50 may be made of metal or it may be of a non-metallic molded plastic.

In some cases if the cage is made of a plastic the molybdenum sulfide may be introduced as a filler into the plastic in such large quantities that it will be available for the coating of the balls 38 as the plastic wears during operation.

The bearings 32 may be supplied with molybdenum sulfide by the manufacture of the bearing and the user thereof need not process the bearing any further but simply set the bearing into his apparatus in the customary manner. A lifetime quantity of lubricant may be placed within the ball or roller bearing at the time of manufacture, and thus the problem of adding additional quantities of lubricant need not be met by the user. This constitutes an advantage over the employment of thin coatings of other materials which may be placed by electrodeposition or evaporation upon the bearings, such coatings having a limited life. The molybdenum sulfide coating will rebuild or maintain itself upon the bearing if a suitable quantity is sealed in with the bearing.

While the specific example in the drawing relates to an X-ray tube having a rotating anode, the bearings are suitable for numerous other applications. The lubricant has characteristics which permits its usage at high temperatures as well as high vacua.

Roller bearings as well as ball bearings may be supplied with molybdenum sulfide for vacuum service.

Since certain changes in carrying out the above process and certain modifications in the article which embody the invention may be made without departing from its scope, it is intended that all the matter contained in the above description or shown in the accompanying drawing shall be interpreted as illustrative and not in a limiting sense. Therefore it is desired that the invention be interpreted as broadly as possible, and that it be limited only by what is set forth in the following claims.

I claim as my invention:

1. A lubricant for bearings for use in a high vacuum without causing deterioration of the vacuum, comprising one or more metallic compounds selected from the group consisting of molybdenum sulfide, molybdenum telluride, molybdenum selenide, tungsten sulfide and tungsten telluride.

2. A bearing having rolling elements suitable for use in a high vacuum, the bearing containing an amount of a lubricant selected from the group of metallic compounds consisting of molybdenum sulfide, molybdenum selenide, molybdenum telluride, tungsten sulfide and tungsten telluride, the lubricant being characterized by reduction of the bearing noise and decrease of the bearing friction to the extent that the coasting time of the bearing is increased sixty times or better, and the lubricant having a negligible deteriorating effect on the vacuum at temperatures up to about 700° C.

3. A bearing having rolling elements suitable for use in a high vacuum, the bearing containing an amount of a lubricant selected from the group of metallic compounds consisting of a molybdenum sulfide, molybdenum selenide, molybdenum telluride, tungsten sulfide and tungsten telluride, and sealing means on the bearing to confine the lubricant for cooperation with the moving elements.

4. A bearing having rolling elements suitable for use in a high vacuum, the bearing containing an amount of a lubricant selected from the group of metallic compounds consisting of molybdenum sulfide, molybdenum selenide, molybdenum telluride, tungsten sulfide and tungsten telluride, and a rolling element retaining cage embracing the rolling elements, the cage containing means for holding a supply of the lubricant adjacent the bearing surfaces for distribution of the lubricant thereto.

5. In an X-ray tube comprising a sealed chamber operating at high vacuum, a rotating anode within the sealed chamber including a rotor body adapted to be revolved at a high speed and a bearing having rolling elements for supporting the rotating anode, and a supply of lubricant cooperating with the bearing, the lubricant being selected from the group consisting of molybdenum sulfide, molybdenum telluride, molybdenum selenide, tungsten sulfide and tungsten telluride, the lubricant being characterized by good antifriction properties in vacuum and negligible deteriorating effect on the high vacuum at the temperatures and pressures prevalent in the X-ray tube.

6. In an X-ray tube comprising a sealed chamber operating at high vacuum, a rotating anode within the sealed chamber including a rotor body adapted to be revolved at a high speed and a bearing having rolling elements for supporting and rotating anode, the bearing having sealing means for retaining a lubricant therein in contact with the rolling elements, and a supply of lubricant cooperating with the bearing to decrease friction and noise and to increase the life of the bearing in the evacuated chamber, the lubricant being selected from the group consisting of molybdenum sulfide, molybdenum telluride, molybdenum selenide, tungsten sulfide and tungsten telluride, the lubricant being characterized by good antifriction properties in vacuum and negligible deteriorating effect on the high vacuum at the temperatures and pressures prevalent in the X-ray tube.

7. In an X-ray tube comprising a sealed chamber operating at high vacuum, a rotating anode within the sealed chamber including a rotor body adapted to be revolved at a high speed and a bearing having rolling elements for supporting the rotating anode, the bearing having a retaining cage cooperative with the rolling elements to maintain alignment thereof, the retaining cage having portions carrying a supply of lubricant for distribution to the bearing surfaces, and a supply of lubricant carried by the portions of the retaining cage and cooperating with the bearing to decrease friction and noise and to increase the life of the bearing in the evacuated chamber, the lubricant being selected from the group consisting of molybdenum sulfide, molybdenum telluride, molybdenum selenide, tungsten sulfide and tungsten telluride, the lubricant being characterized by good antifriction properties in vacuum and negligible deteriorating effect on the high vacuum at the temperatures and pressures prevalent in the X-ray tube.

8. In a bearing for operation in a vacuum, in combination, a rotatable bearing member, and means associated with the bearing member for supplying to the bearing member a lubricant composed of a metallic compound selected from the group consisting of molybdenum sulfide, molybdenum selenide, molybdenum telluride, tungsten sulfide and tungsten telluride.

9. In a bearing for operation in a vacuum, in combination, a bearing member, the bearing member having a surface capable of carrying a lubricant, and a lubricant composed of one or more of the metallic compounds selected from the group consisting of molybdenum sulfide, molybdenum telluride, molybdenum selenide, tungsten sulfide and tungsten telluride, the lubricant carried on the surface of the bearing member.

PORTER H. BRACE.